United States Patent
Dine et al.

[15] 3,687,030
[45] Aug. 29, 1972

[54] CLOSE-UP CAMERA ATTACHMENT

[72] Inventors: Lester A. Dine, 145 Grist Mill Lane, Great Neck, N.Y. 11023; Edgar S. Lemmey, 73 Lester Ave., Freeport, N.Y. 11520

[22] Filed: Dec. 13, 1968

[21] Appl. No.: 864,917

Related U.S. Application Data

[63] Continuation-in-part of Ser. No. 623,118, March 14, 1967, abandoned.

[52] U.S. Cl. ................................................. 95/11
[51] Int. Cl. ......................... G03b 27/54, G03b 15/06
[58] Field of Search ..................... 95/11; 355/39, 64

[56] References Cited

UNITED STATES PATENTS

| | | | |
|---|---|---|---|
| 2,277,448 | 3/1942 | Munsinger | 355/39 |
| 2,403,892 | 7/1946 | McFarlane | 95/11 |
| 2,478,641 | 8/1949 | Rose | 355/64 |

*Primary Examiner*—John M. Horan
*Attorney*—Darby & Darby

[57] ABSTRACT

A camera attachment for close-up use comprising a vertical supplementary lens-holding plate having a downwardly angled light deflecting panel at the upper portion thereof and optionally an upwardly angled light-deflecting panel at its lower portion, a locator arm attached to and extending out from said plate for a fixed and predetermined distance, a view-bracketing frame at the terminus of said arm, an optional translucent light diffuser window in the lens-holding plate opposite the light source and on the vertical side of a hood arrangement formed by the angle between the vertical lens-holding plate and the downwardly angled light-deflecting panel.

9 Claims, 6 Drawing Figures

Patented Aug. 29, 1972  3,687,030

INVENTORS
LESTER A. DINE
EDGAR S. LEMMEY

BY Darby & Darby

ATTORNEYS

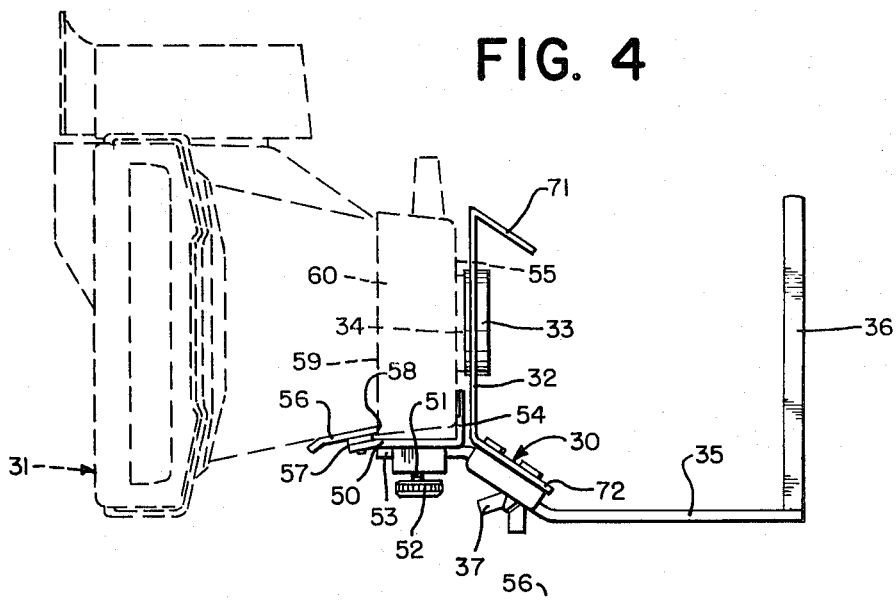
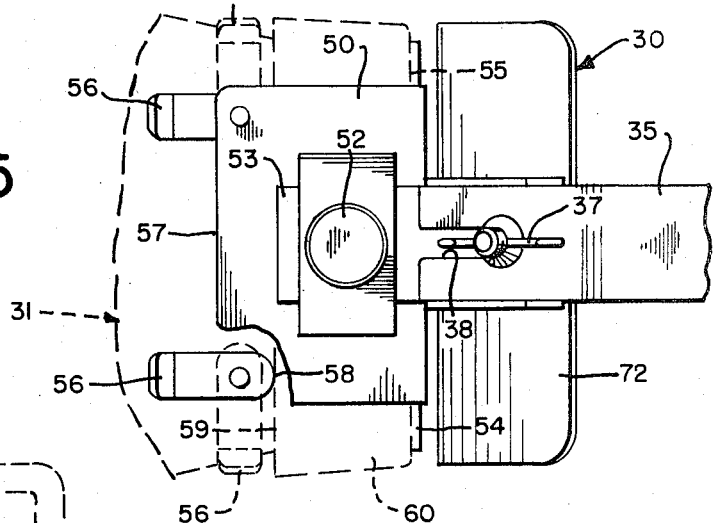
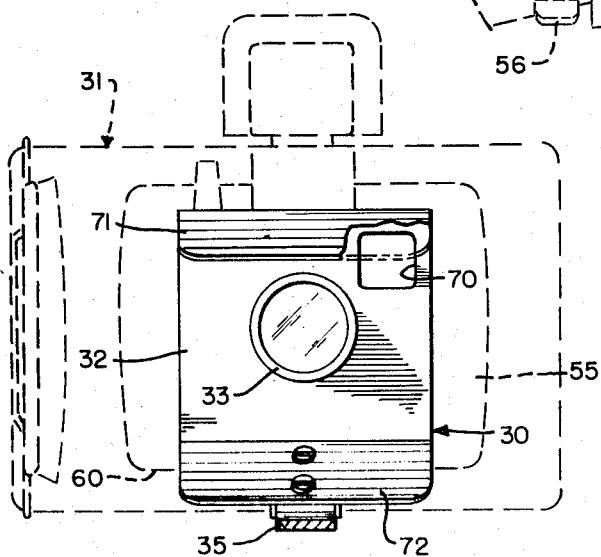

CLOSE-UP CAMERA ATTACHMENT

This is a continuation-in-part application of patent application Ser. No. 623,118, filed Mar. 14, 1967, now abandoned.

At the present tine close-up photography is increasing greatly in popularity and usefulness throughout the country, especially in biological, medical, dental and other scientific applications. Its growth however has been retarded by several factors. More particularly the time and skill required to position the subject, select the proper focus and other adjustments for the camera and arrange the available lighting have discouraged the less skilled photographers. Without control of these variables one cannot hope to obtain accurate and reproducible results every time a picture is taken. Moreover, the cost and cumbersome nature of lighting apparatus presently required imposes a dissuading burden on the non-professional amateur photographer who would otherwise employ such a camera in studies and research.

With techniques currently in use, the close-up camera user, even after measuring the camera-to-subject distance and positioning his lighting to avoid too much illumination, may still obtain blurred or uneven photographs if his subject moves or if there are any light-reflective surfaces in the proximate vicinity of the surface of the subject. Since close-up photography is frequently employed in dental operations or orthodontic dentistry where children are involved it is obvious that such problems as movement of the subject pose very real problems. This is particularly true where a floodlight is employed which shines into the eyes of the youngsters to disturb them and cause such movement.

As an alternative to the use of floodlights or floodlamps as a light source, use of flash photography has not been successful for close-up photography chiefly because the intensity of light supplies to the surface of the subject area being photographed has been uneven due to the necessary offsetting of the light source from the lens axis, so that the area directly opposite the light source receives too much illumination and that area off the incident line of light receives less light. The net result is a picture having uneven exposure over its area.

It is an advantage of the present close-up camera attachment that means are provided to insure that flush photography may be used without producing uneven exposure, and with great simplicity of operation, since the subject need only be maintained in contact with the terminus of a locator arm and view-bracketing frame to ensure proper focus of the lens and consequently uniformly clear pictures.

A further specific advantage resides in the unique baffle and light-diffusing effect of the lens-holding plate in that one or two angular deflector panels and a translucent diffuser panel positioned between the flash source and the subject to be photographed cause the proper amount of light to be supplied relatively uniformly over the total surface of the subject area within the view-bracketing frame at the proper point of focus of the lens, avoiding over-illumination of portions of the subject area and reducing the effect of parallax between the light source and the lens.

The present invention provides a camera attachment for close-up photography which is greatly improved in design and construction and constitutes an almost foolproof device for the taking of close-up camera shots at a range of from 6 to 18 inches from the subject being photographed. It provides for the first time a close-up camera device which permits the use of flash cubes or bulbs of high light intensity at close range without deleteriously affecting the final photograph. It obviates the tedious and time-consuming arrangement of floodlights, measurement of focal distances, and adjustment of close-up lens systems to those distances at which subjects are sought to be photographed which has long irritated close-up photographers and prevented uniformly successful results from close-up photography.

It is a principal object of the present invention therefore to provide a camera attachment of improved design and construction capable of use as a portable unit having uniform reproducibility of properly focused photographs.

A still further and more specific object of the invention is to provide a close-up camera device which is capable of use with a flash cube or flashbulb to afford a uniformly diffuse light distribution over the entire area of the subject to be photographed at the proper focus point of the lens system.

For the accomplishment of the foregoing and related objects, the present invention comprises the features hereinafter fully described and particularly pointed out in the several claims following the description of its construction and use in connection with the annexed drawing setting forth in detail and illustrative embodiment of the invention and but a few of the various ways in which the principle of the invention may be employed.

In the drawings:

FIG. 4 is a side-elevational view of a modified form of camera attachment according to the present invention mounted on a different type of camera;

FIG. 5 is a detailed, partially fragmentary bottom view of the camera attachment of FIG. 4 showing the mechanism for mounting the attachment on the camera; and FIG. 6 is partially fragmentary front view of the modified camera attachment of FIG. 4.

Figure 1:
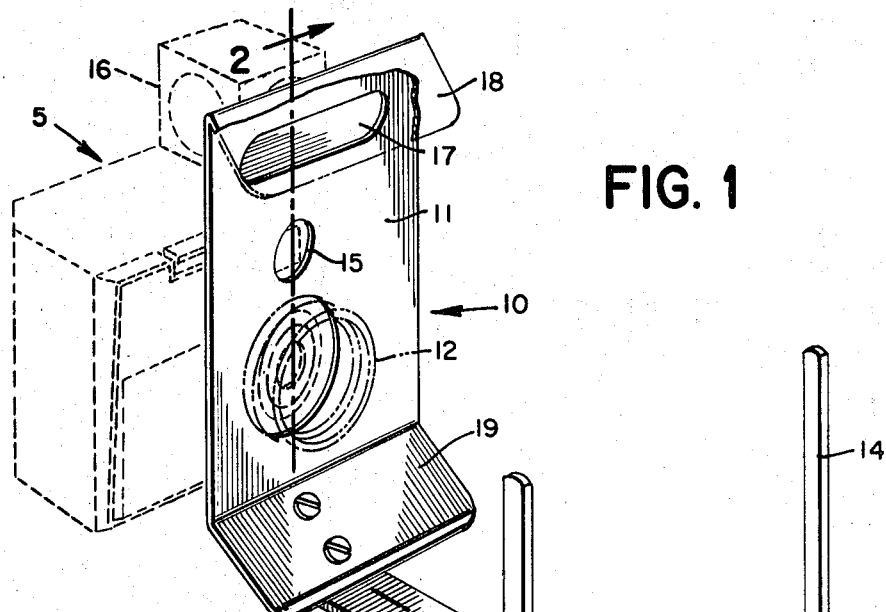
FIG. 1 is a perspective view taken from the right front of a preferred form of the camera attachment of the present invention as it would be seen attached to a camera.
Figure 2:
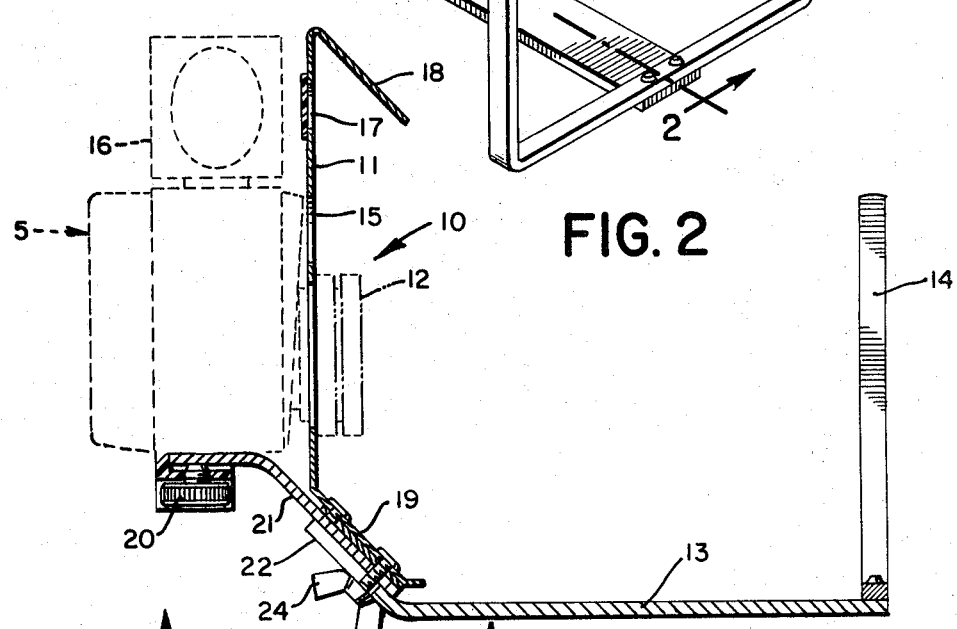
FIG. 2 is a side view of the device of FIG. 1 taken in cross-section along the plane indicated by 2—2 in FIG. 1.
Figure 3:
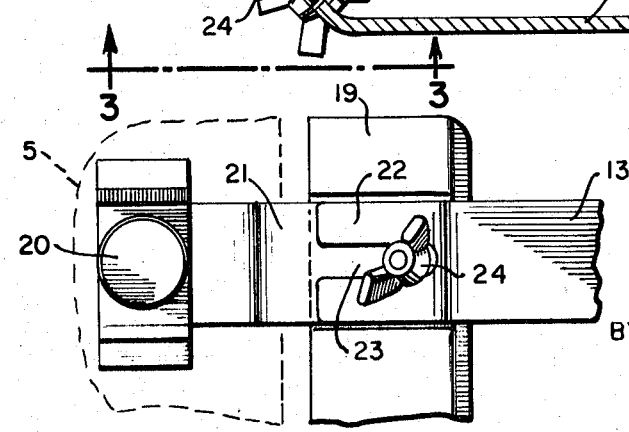
FIG. 3 is a fragmentary bottom view of the device of FIG. 1.

Referring to FIGS. 1 through 3, the present invention is illustrated as applied to a conventional camera 5 having a built-in flash attachment 16 such as the common "flash cube" form of photographic flash source. By way of example the camera may be a conventional Kodak fixed-focus close-up camera, or may be a conventional adjustable focus camera in which case the focus is left fixed at a predetermined point, which may be at a fixed distance (such as 27 inches) or at infinite distance. The close-up camera attachment 10 of the present invention includes a vertically positioned lens-holding plate 11 which is preferably formed of highly reflective polished stainless steel or a chrome alloy. The plate 11 holds a lens 12 which is adapted to be frinctionally positioned snugly and fixedly over the built-in lens of the camera 5, and converts the fixed or preset camera lens to the desired focal distance, illustratively 6 to 18 inches from the camera, as may be desired.

Attached to the base of the lens-holding plate 11 by any suitable means is a measuring or locating arm 13 which has at its terminus a picture-bracketing frame 14 fastened thereto. The length of the locating arm 13 and the size of the bracketing frame 14 are selected conjointly in known manner in relation to the characteristics of the attachment lens 12 and the preset or predetermined camera lens so that the field of view of the camera (as modified by the attachment lens 12) substantially coincides with the area enclosed by the frame 14 and the lens system focus is in the plane of the frame 14. The lens-holding plate 11 has a sighting window 15 corresponding to and overlying the view-finder opening or sighting window of the camera and at its uppermost end projects above the camera to interpose itself between the light source 16, such as a conventional flash cube or flash-bulb, and the subject being photographed. Located centrally in the vertical portion of the lens-holding plate opposite the light source in this form of the invention is a translucent light diffuser window 17, such as of plastic or the like and illustrated as oval or elongated horizontally to spread the light side-wise. This window 17 is within the vertical side of a hoodlike arrangement formed by the vertical wall of the lens-holding plate 11 and a downwardly projecting upper light-reflecting panel 18 at an acute angle with the lens-holding plate 11. This angle is at an optimum of 40° for a system intended to take photos at a distance of about 5 or 6 inches, but it may be suitably altered to reflect the incident light to suit the particular distance desired.

In addition to the upper light-reflecting panel 18, a second lower light-reflecting panel 19 may be provided which is angled upward at about the same angle, to insure capture of any downwardly reflected light rays and projection of these rays also into the desired picture-taking area. The lower portion of the lens-holding plate 11 is secured to an attachment arm 21 having a bifurcated end 22 which rides around the usual clamping screw 20 on a conventional camera, to hold the plate 11 fixed to the camera 5 with lens 12 in proper position over the regular camera lens.

It will be understood that while the lower reflecting panel 19 is useful in reflecting toward frame 14 some of the light which may impinge on panel 19 from the upper panel 18 or the vertical panel 11, where this added light is not needed the lower reflecting panel 19 may be omitted or formed simply as an extension of vertical panel 11. Also, where different size fields of view are desired, the attachment arm 13 and fame 14 may be replaced by another such arrangement, giving the appropriate field of view at the appropriate distance. In such case the close-up lens 12 is replaced by one having the correlated focal length to form a focus for the particular lens system at the new frame distance.

In operation, the camera is adapted for close-up work by affixing to it the close-up lens 12 and the close-up camera attachment 10 by means of the clamp 20 which holds the device through the attachment arm 21 to the base of the camera.

The flashcube light source 16 is then inserted and the subjected is positioned within the picture-bracketing frame 14. This is done simply by placing the frame 14 against the subject with the portion whose photograph is desired being suitably positioned within the frame 14. When the photo is snapped, the usable portion of the light from the flash of the flash cube 16 passes through the translucent light diffuser window 17 where it is diffused and then reflected from the under surface of the angular light-reflecting panel 18 back onto the lens-holding plate 11. From the lens-holding plate some of the light is again reflected from that surface to the area within the picture-bracketing frame 14. Light which is reflected downward from the lens-holding plate is caught and reflected by the lower light-reflecting panel 19 toward the frame 14. The area within the picture-bracketing frame 14 hence has a substantially uniform intensity of diffused light impinging thereon. Since the frame is at the precise point of focus of the lens system, the resulting photo is clear, well illuminated and even in detail.

An important feature of novelty of the close-up camera attachment of the present invention is the unique interrelationships existing between the fixed-focus close-up lens, the angular light-diffusion panels, the light diffuser window (when used) and the subject locator arm and picture-bracketing frame. For example, the particular close-up lens employed is adapted to have its focal point exactly coincide with the fixed location of the subject to be photographed within the picture-bracketing frame. The angle of the upper light diffuser panel 18 is also fixed so that in conjunction with the reflective surface of the vertical lens-holding panel the reflected light passing through the window 17 is directed to impinge upon the circumscribed area within the picture-bracketing frame in a predetermined diffused pattern. For example, where a particular close-up lens has a focal point at 5 inches from the camera, the picture-bracketing frame will be fixed at that point by extension of the locator arm. The angle between the upper light-diffuser panel and the vertical lens-holding panel which provides a optimum illumination when employing a lens having a 5-inch focal point has been found to be 40°. Of course, if it is desired to change the lens and focus point of the subject, this angle will change accordingly. The general rule is that as the distance outward from the lens to the focus point increases, the angle defined by the diffuser panel and the vertical lens-holding panel will also increase correspondingly.

In use, a portable unit having the camera attachment of the invention is capable of easy use by any amateur photographer by simply being placed up against the subject to be photographed, inserting the close-up lens over the regular lens, inserting a flashcube in the camera and taking the picture. The subjects generally photographed in the process of close-up photography of course may be many diverse objects varying from prints, sketches or drawings, to selected portions of a surgical or anatomical area in the course of hospital surgery or commonly a portion of the mouth in dental surgery. With the use of the subject attachment, the improved lighting of the area to be photographed and the constant focus of the lens system renders the ultimate close-up photographs obtained capable of exhibiting great detail and clarity, and hence makes them of unique value in many applications.

Alternatively, in place of having the attachment lens 12 mounted on the plate 11, it may be separately secured to the camera independent of the plate 11, in which case the plate 11 is provided with an opening surrounding lens 12 when the attachment is in place.

The form of the invention just described is highly useful with cameras having a conventional bottom clamping screw such as 20. While such cameras constitute a large portion of conventional cameras, some cameras do not have such a screw. Also, certain cameras do not permit mounting a supplemental lens (such as 12) over the regular camera lens. Other forms of the present invention are adapted for use with such cameras notwithstanding their differences from the camera 5 of FIGS. 1–3.

Referring now to FIGS. 4, 5, and 6 of the drawings, there is shown a modified form of close-up camera attachment according to the present invention, generally designated 30, adapted to be mounted on a camera, generally designated 31, which may be of the instant developing type such as, for example, the Polaroid "BIG SWINGER 3000," manufactured by the Polaroid Corp. of Cambridge, Mass. The modified close-up camera attachment 30 includes a vertically positioned lens-holding plate 32 which is preferably formed of highly reflective polished stainless steel or chrome alloy, as is the vertical plate 11 of the camera attachment 10 shown in FIGS. 1–3. The plate 32 holds a close-up lens mounting 33 which is positioned over the fixed lens mounting 34 of camera 31 so as to convert the combined lens system to the desired focal distance for close-up photography, illustratively 5 to 6 inches. In this case, attachment lens 34 is not supported by the camera lens, but by the plate 32.

Detachably secured to the bottom of plate 32 is a locating arm 35 which is illustratively 5 to 6 inches long. A picture-framing bracket 36 is mounted at the end of locating arm 35 to frame the field of view of the lens system. The locating arm 35 may be mounted on the bottom of plate 32 by means of a wing nut 37 and slot 38 as shown in FIG. 5, or by any other suitable means.

The assembly including vertical plate 32 and locating arm 35 is attached to a mounting plate 50 by means of a screw 51 having a knurled head 52 which clamps a tongue 53 against plate 50. Tongue 53 is affixed to deflector plate 72 at the bottom of lens-holding plate 32. The mounting plate 50 includes an upwardly extending flange 54 which contacts the front surface 55 of camera 31. A pair of pivoted lugs 56 are mounted on mounting plate 50 adjacent its rearward edge 57. When the lugs 56 are in the position shown in FIG. 5, there operative ends 58 provide a camming engagement with the rear edge 59 of front element 60 of camera 31, thus clamping flange 54 against the front camera surface 55 and thereby holding mounting plate 50 in position on camera 31. When the lugs 56 are moved to the positions shown in dotted lines in FIG. 5, the mounting plate 50 may readily be removed from camera 31. This simple clamping arrangement thus permits a readily disengageable mounting for the close-up attachment on cameras of this type having an enlarged front portion 60 or a shoulder on which lugs 56 may bear.

FIG. 6 of the drawings is a front view of the close-up camera attachment 30 showing an opening 70 in the upper right-hand corner of vertical plate 32. The opening 70 coincides with the flash window of the camera 31. Where the flash window of the camera is provided with a light diffuser arrangement (as in the Polaroid "BIG SWINGER 3000" camera), no light diffuser need be provided within the opening 70 of the modified close-up attachment 30 shown in FIGS. 4–6.

As in the case of the close-up attachment 10 shown in FIGS. 1–3, the modified close-up attachment 30, shown in FIGS. 4–6, includes angled light-reflecting panels 71 and 72 mounted at the top and bottom respectively of vertical plate 32 in order to provide more uniform illumination of the field of view framed within picture-bracketing frame 36, in response to a flash from the camera's light-flash arrangement. For a focal distance of 5 to 6 inches, panel 71 is preferably mounted at an angle of approximately 40° to vertical plate 32. Panel 72 is preferably approximately parallel to panel 71, and is therefore mounted at an angle of approximately 140° to vertical plate 32.

The present disclosure merely sets forth our preferred construction and mode of operation of our novel close-up camera attachment. Undoubtedly, many variations thereof will become obvious to those versed in the art after a consideration of our invention, and the present invention is not to be deemed to be limited solely to the preferred forms described herein, to the exclusion of those variations which fall within the skill of the art. The scope of the invention is to be limited solely by the claims appended hereto.

What is claimed is:

1. A camera attachment for adapting to close-up use a camera having a camera lens and a flashbulb holder, comprising a vertical light-reflecting plate having at its top a downwardly slanting light-reflecting panel, means for attaching said plate to and over the front of said camera, a close-up lens positionable over said camera lens to modify the focal distance thereof to a predetermined position, a locator arm attached to and extending forwardly out from said plate and having its outer end at said predetermined position, a picture-bracketing frame at the other end of the locator arm and having an area corresponding to the desired field of view, and a window in said plate opposite the position of said flashbulb holder.

2. A camera attachment according to claim 1, wherein the downwardly angled light-reflecting panel is directed downwardly at substantially a 40° angle from the plate.

3. A camera attachment as in claim 1, wherein said light-reflecting panel extends downwardly at least partially over said window.

4. A camera attachment as in claim 1, wherein said plate has at its bottom a bent light-reflecting panel for upwardly directing light reflected from said top light-reflecting panel.

5. A camera attachment according to claim 4, wherein the top light-reflecting panel is directed downwardly at substantially a 40° angle from the vertical plate and the bottom light-reflecting panel is directed upwardly at an angle of substantially 40° from the bottom of the said vertical plate.

6. A camera attachment as in claim 1, wherein said close-up lens is mounted on said vertical plate.

7. A camera attachment as in claim 1, wherein said close-up lens is adapted to be mounted on said camera lens and said plate has an opening adapted to register with said close-up lens.

8. A camera attachment as in claim 1, wherein said window in said vertical plate is formed of a translucent light-diffusing material.

9. A camera attachment as in claim 1 wherein said camera has a front portion having a front surface and a body surface joined to the remainder of said camera by an inwardly extending shoulder, said means for attaching said vertical plate to and over the front of said camera comprises a mounting plate including a flange adapted to contact said camera front surface and a lug pivotally mounted on said mounting plate adjacent the rearward edge of said mounting plate to provide a camming engagement with said shoulder so as to clamp said flange against the front surface of the camera, thus holding the mounting plate in position.

* * * * *